United States Patent
Nagamine et al.

(10) Patent No.: US 11,411,247 B2
(45) Date of Patent: Aug. 9, 2022

(54) SOLID ELECTROLYTE MATERIAL AND BATTERY

(71) Applicant: Panasonic Intellectual Property Management Co., Ltd., Osaka (JP)

(72) Inventors: Kenta Nagamine, Osaka (JP); Akihiro Sakai, Nara (JP); Tetsuya Asano, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 242 days.

(21) Appl. No.: 16/816,278

(22) Filed: Mar. 12, 2020

(65) Prior Publication Data

US 2020/0212481 A1 Jul. 2, 2020

Related U.S. Application Data

(63) Continuation of application No. PCT/JP2018/043363, filed on Nov. 26, 2018.

(30) Foreign Application Priority Data

Jan. 5, 2018 (JP) .............................. JP2018-000419
Jan. 5, 2018 (JP) .............................. JP2018-000420
(Continued)

(51) Int. Cl.
- *H01M 10/0562* (2010.01)
- *C01F 17/36* (2020.01)
- *H01M 10/0525* (2010.01)

(52) U.S. Cl.
CPC ......... *H01M 10/0562* (2013.01); *C01F 17/36* (2020.01); *H01M 10/0525* (2013.01);
(Continued)

(58) Field of Classification Search
CPC .. C01F 17/36; C01P 2002/88; C01P 2004/32; C01P 2004/51; C01P 2004/61;
(Continued)

(56) References Cited

U.S. PATENT DOCUMENTS

| 4,352,869 A | 10/1982 | Mellors |
| 5,506,073 A | 4/1996 | Angell et al. |

(Continued)

FOREIGN PATENT DOCUMENTS

| CN | 105254184 | 1/2016 |
| CN | 105680048 A | 6/2016 |

(Continued)

OTHER PUBLICATIONS

International Search Report of PCT application No. PCT/JP2018/043363 dated Feb. 19, 2019.
(Continued)

*Primary Examiner* — Victoria H Lynch
(74) *Attorney, Agent, or Firm* — McDermott Will & Emery LLP

(57) ABSTRACT

Provided is a solid electrolyte material represented by the following composition formula (1):

$$Li_{3-3d}(Y_{1-x}M_x)_{1+d}X_6 \qquad \text{Formula (1)}$$

where
M is an element having an ionic radius larger than that of Y;
X is at least one kind of element selected from the group consisting of F, Cl, Br and I;
$0 < x \leq 1$; and
$-0.15 \leq d \leq 0.15$.

14 Claims, 3 Drawing Sheets

(30) Foreign Application Priority Data

| Date | Country | Number |
|---|---|---|
| Jan. 5, 2018 | (JP) | JP2018-000422 |
| Jan. 5, 2018 | (JP) | JP2018-000425 |
| Jan. 5, 2018 | (JP) | JP2018-000426 |
| Jan. 5, 2018 | (JP) | JP2018-000427 |
| Jan. 5, 2018 | (JP) | JP2018-000428 |
| Jan. 5, 2018 | (JP) | JP2018-000432 |
| Jan. 5, 2018 | (JP) | JP2018-000433 |
| Jan. 5, 2018 | (JP) | JP2018-000434 |
| Jan. 5, 2018 | (JP) | JP2018-000435 |
| Jan. 26, 2018 | (JP) | JP2018-011535 |
| Jan. 26, 2018 | (JP) | JP2018-011536 |
| Oct. 1, 2018 | (JP) | JP2018-186411 |

(52) U.S. Cl.
CPC ...... *C01P 2002/88* (2013.01); *C01P 2006/40* (2013.01); *H01M 2300/008* (2013.01)

(58) Field of Classification Search
CPC .... C01P 2004/62; C01P 2006/40; H01B 1/06; H01M 10/052; H01M 10/0525; H01M 10/0562; H01M 2300/0068; H01M 2300/008; Y02E 60/10
See application file for complete search history.

(56) References Cited

U.S. PATENT DOCUMENTS

| | | |
|---|---|---|
| 5,714,279 A | 2/1998 | Zajac, Jr. et al. |
| 9,160,034 B2 | 10/2015 | Kato et al. |
| 10,008,735 B2 | 6/2018 | Ohtomo et al. |
| 2004/0151986 A1 | 8/2004 | Park et al. |
| 2011/0045355 A1 | 2/2011 | Ichikawa |
| 2012/0301796 A1 | 11/2012 | Ohtomo et al. |
| 2012/0308900 A1 | 12/2012 | Ogasa |
| 2013/0295464 A1 | 11/2013 | Yanagi et al. |
| 2015/0147659 A1 | 5/2015 | Kato |
| 2016/0103232 A1 | 4/2016 | Ouspenski et al. |
| 2016/0149259 A1 | 5/2016 | Osada et al. |
| 2016/0156064 A1 | 6/2016 | Miyashita et al. |
| 2016/0204467 A1 | 7/2016 | Nogami et al. |
| 2016/0248119 A1 | 8/2016 | Kato |
| 2016/0268630 A1 | 9/2016 | Tsukada et al. |
| 2016/0285078 A1 | 9/2016 | Deschamps et al. |
| 2016/0308210 A1 | 10/2016 | Sakuda et al. |
| 2016/0359193 A1 | 12/2016 | Yi et al. |
| 2017/0040637 A1 | 2/2017 | Ceder et al. |
| 2017/0179481 A1 | 6/2017 | Yamada et al. |
| 2017/0187066 A1 | 6/2017 | Tsujimura et al. |
| 2017/0222257 A1 | 8/2017 | Miyashita et al. |
| 2017/0229734 A1 | 8/2017 | Furukawa et al. |
| 2017/0288281 A1 | 10/2017 | Chiang et al. |
| 2018/0269521 A1 | 9/2018 | Ohtomo et al. |
| 2019/0067736 A1 | 2/2019 | Yoshioka et al. |
| 2019/0088995 A1 | 3/2019 | Asano et al. |
| 2019/0097266 A1 | 3/2019 | Yamamoto et al. |
| 2020/0328454 A1 | 10/2020 | Sakai et al. |
| 2020/0328455 A1 | 10/2020 | Sakai et al. |
| 2020/0328457 A1 | 10/2020 | Sakai et al. |
| 2020/0328460 A1 | 10/2020 | Asano et al. |
| 2020/0328461 A1 | 10/2020 | Asano et al. |
| 2020/0328462 A1 | 10/2020 | Asano et al. |
| 2020/0328464 A1 | 10/2020 | Asano et al. |
| 2020/0328465 A1 | 10/2020 | Sakaida et al. |
| 2020/0328468 A1 | 10/2020 | Sakaida et al. |
| 2020/0328469 A1 | 10/2020 | Asano et al. |
| 2020/0335817 A1 | 10/2020 | Asano et al. |
| 2020/0350615 A1 | 11/2020 | Sakaida et al. |
| 2020/0350622 A1 | 11/2020 | Sakaida et al. |

FOREIGN PATENT DOCUMENTS

| | | |
|---|---|---|
| CN | 108701860 A | 10/2018 |
| EP | 2916381 B1 | 6/2016 |
| EP | 3428929 A1 | 1/2019 |
| EP | 3496202 A1 | 6/2019 |
| EP | 3736831 A1 | 11/2020 |
| EP | 3736834 A1 | 11/2020 |
| EP | 3736899 A1 | 11/2020 |
| EP | 3745422 A1 | 12/2020 |
| EP | 3745518 A1 | 12/2020 |
| IN | 201847045950 A | 2/2019 |
| JP | 57-132677 | 8/1982 |
| JP | H05-306117 A | 11/1993 |
| JP | H08-171938 A | 7/1996 |
| JP | H09-293516 A | 11/1997 |
| JP | 11-238528 A | 8/1999 |
| JP | 2001-052733 A | 2/2001 |
| JP | 2004-235155 A | 8/2004 |
| JP | 2006-244734 A | 9/2006 |
| JP | 2008-021556 A | 1/2008 |
| JP | 2011-129312 | 6/2011 |
| JP | 5076134 B2 | 11/2012 |
| JP | 2012-246196 A | 12/2012 |
| JP | 2013-073791 | 4/2013 |
| JP | 2015-011901 A | 1/2015 |
| JP | 2015-032529 A | 2/2015 |
| JP | 2015-056349 A | 3/2015 |
| JP | 2016-024874 A | 2/2016 |
| JP | 2016-171067 | 9/2016 |
| JP | 2017-059342 A | 3/2017 |
| JP | 2017-091953 A | 5/2017 |
| JP | 2017-091955 A | 5/2017 |
| JP | 2017-117753 A | 6/2017 |
| JP | 2017-518622 A | 7/2017 |
| JP | 2017-152324 A | 8/2017 |
| JP | 6222134 B2 | 11/2017 |
| JP | 2017-224474 A | 12/2017 |
| WO | 2011/073798 A2 | 6/2011 |
| WO | 2015/011937 A1 | 1/2015 |
| WO | 2015/030052 A1 | 3/2015 |
| WO | 2015/049986 A1 | 4/2015 |
| WO | 2017/108105 A1 | 6/2017 |
| WO | 2017/154766 A1 | 9/2017 |
| WO | 2017/154922 A1 | 9/2017 |
| WO | 2018/025582 A1 | 2/2018 |

OTHER PUBLICATIONS

Andreas Bohnsack et al., "The Bromides Li3MBr6 (M=Sm-Lu, Y): Synthesis, Crystal Structure, and Ionic Mobility", Journal of Inorganic and General Chemistry, Sep. 1997, vol. 623/Issue 9, pp. 1352-1356.

Andreas Bohnsack et al., "Ternary Chlorides of the Rare-Earth Elements with Lithium, Li3MCl6 (M=Tb-Lu, Y, Sc): Synthesis, Crystal Structures, and Ionic Motion", Journal of Inorganic and General Chemistry, Jul. 1997, vol. 623/Issue 7, pp. 1067-1073.

International Search Report of International Application No. PCT/JP2018/041893 dated Feb. 19, 2019.

International Search Report of International Application No. PCT/JP2018/041892 dated Feb. 19, 2019.

International Search Report of International Application No. PCT/JP2018/041894 dated Feb. 19, 2019.

International Search Report of International Application No. PCT/JP2018/046258 dated Feb. 5, 2019.

International Search Report of International Application No. PCT/JP2018/046259 dated Mar. 12, 2019.

International Search Report of International Application No. PCT/JP2018/046260 dated Mar. 12, 2019.

International Search Report of International Application No. PCT/JP2018/046262 dated Mar. 19, 2019.

International Search Report of International Application No. PCT/JP2018/041900 dated Feb. 19, 2019.

International Search Report of International Application No. PCT/JP2018/041897 dated Feb. 19, 2019.

(56) References Cited

OTHER PUBLICATIONS

International Search Report of International Application No. PCT/JP2018/046263 dated Mar. 19, 2019.
International Search Report of International Application No. PCT/JP2018/046264 dated Mar. 19, 2019.
International Search Report of International Application No. PCT/JP2018/042061 dated Feb. 19, 2019.
International Search Report of International Application No. PCT/JP2018/042062 dated Feb. 19, 2019.
Yasumasa Tomita et al., "Lithium ion conductivity of Li3InBr6 doped with different element", Denka Chemical Society 70th Anniversary Conference Abstracts, Mar. 25, 2003, p. 384; with English translation.
Yasumasa Tomita et al., "Preparation of Substituted Compounds of Lithium Indium Bromide and Fabrication of All Solid-State battery", Recent Innovations in Chemical Engineering, 2017, 10, 12-17.
The Extended European Search Report dated Jan. 29, 2021 for the related European Patent Application No. 18898666.5.
The Extended European Search Report dated Feb. 5, 2021 for the related European Patent Application No. 18898795.2.
The Extended European Search Report dated Feb. 9, 2021 for the related European Patent Application No. 18898242.5.
The Extended European Search Report dated Feb. 9, 2021 for the related European Patent Application No. 18898043.7.
The Extended European Search Report dated Feb. 9, 2021 for the related European Patent Application No. 18898663.2.
The Extended European Search Report dated Feb. 9, 2021 for the related European Patent Application No. 18898873.7.
The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.
Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988?(Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
Indian Examination Report dated Mar. 28, 2022 for the related Indian Patent Application No. 202047027797.
Indian Examination Report dated Apr. 4, 2022 for the related Indian Patent Application No. 202047027476.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6-clx.," Solid State Ionics 179.21-26 (2008): 867-870. (Year: 2008).
Steiner, H-J., and H. D. Lutz, "Neue schnelle Ionenleiter vom Typ MI3 MIIICl6 (MI = Li, Na, Ag; MIII=In, Y)." Zeitschrift fur anorganhische und allgemeine Chemie 613.7 (1992): 26-30 (Year: 1992).
Tomita, Yasumama et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+ xIn1-xMxBr6 (M = Zn, Co, Fe) by Nano-grinding and their Ionic Conductivity." Transactions of the Materials Research Society of Japan 33.4 (2008): 973-976 (Year: 2008).
G. J. Kipouros et al. Reversible Electrode Potentials for Formation of Solid and Liquid Chlorozirconale and Chlorohafnate Compounds (Year: 1992).
Indian Examinatiion Report dated Jun. 21, 2022 for the related Indian Patent Application No. 202047027487.

SOLID ELECTROLYTE MATERIAL AND BATTERY

BACKGROUND

1. Technical Field

The present disclosure relates to a solid electrolyte material and a battery.

2. Description of the Related Art

Patent Literature 1 discloses an all-solid battery using a sulfide solid electrolyte.

CITATION LIST

Patent Literature

Patent Literature 1: Japanese Patent Application Publication No. 2011-129312

SUMMARY

In the prior art, realization of a solid electrolyte material having a lower melting point is desired.

The solid electrolyte material in one aspect of the present disclosure is represented by the following composition formula (1):

$$Li_{3-3d}(Y_{1-x}M_x)_{1+d}X_6 \qquad \text{Formula (1)}$$

where

M is an element having an ionic radius larger than that of Y;

X is at least one kind of element selected from the group consisting of F, Cl, Br and I;

$0 < x \leq 1$; and $-0.15 \leq d \leq 0.15$.

According to the present disclosure, a solid electrolyte material having a lower melting point can be realized.

DETAILED DESCRIPTION OF THE EMBODIMENTS

Figure 1:
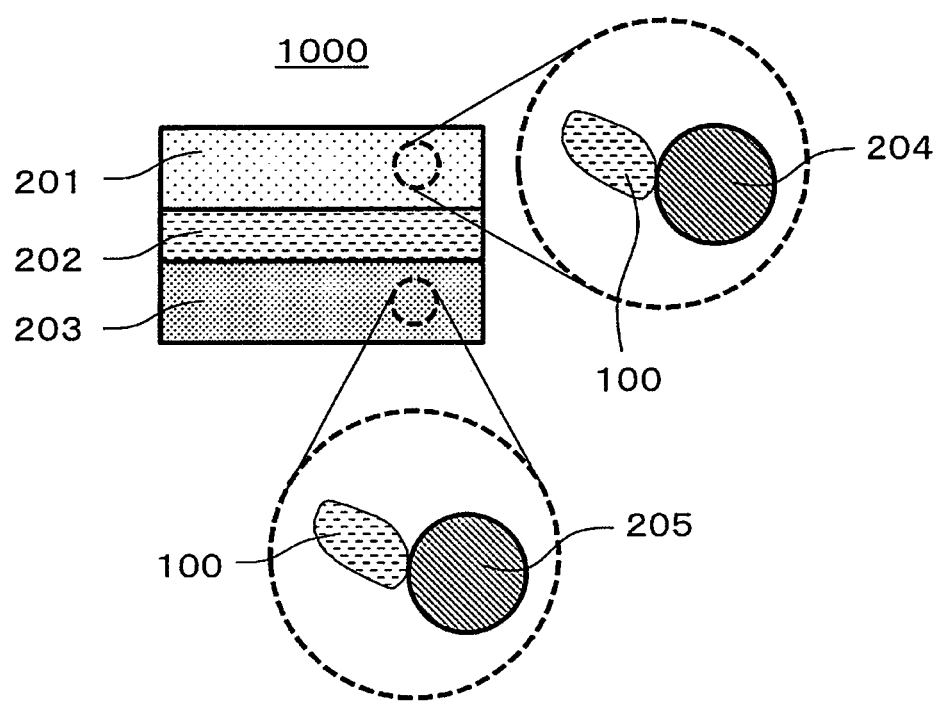
FIG. 1 is a cross-sectional view showing a schematic configuration of a battery in a second embodiment.

Hereinafter, embodiments of the present disclosure will be described with reference to the drawings.

First Embodiment

The solid electrolyte material in the first embodiment is a solid electrolyte material represented by the following composition formula (1).

$$Li_{3-3d}(Y_{1-x}M_x)_{1+d}X_6 \qquad \text{Formula (1)}$$

M is an element having an ionic radius larger than that of Y. X is one or more kinds of elements selected from the group consisting of F, Cl, Br and I. $0 < x \leq 1$ and $-0.15 \leq d \leq 0.15$ are satisfied.

According to the above configuration, a solid electrolyte material having a low melting point can be realized.

Moreover, according to the above configuration, an all-solid secondary battery excellent in a charge/discharge characteristic can be realized by using the solid electrolyte material of the first embodiment. In addition, by using the solid electrolyte material of the first embodiment, the all-solid secondary battery which does not include sulfur can be realized. In other words, if exposed to the atmosphere, the solid electrolyte material of the first embodiment does not have a configuration (for example, the configuration of Patent Literature 1) in which hydrogen sulfide is generated. As a result, an all-solid secondary battery which does not generate hydrogen sulfide and is excellent in safety can be realized.

The "ionic radius" in the present disclosure are values based on the definitions described in "Shannon et al., Acta A32 (1976) 751"

If the element M having an ionic radius larger that of Y is substituted for Y, the bond distance between the halide ion and the metal ion is made longer, so that the melting point would be lowered.

In the composition formula (1), M may be one or more kinds of trivalent elements.

If M is the one or more kinds of the trivalent elements, a solid solution can be formed in a relatively wide composition region.

In addition, in the composition formula (1), M may be one or more kinds of rare earth elements.

According to the above configuration, a solid electrolyte material having a low melting point can be realized.

In addition, in the composition formula (1), M may be one or more kinds of elements selected from the group consisting of La, Ce, Pr, Nd, Pm, Sm, Eu, Gd, Tb, Dy, and Ho.

According to the above configuration, a solid electrolyte material having a low melting point can be realized.

In addition, in the composition formula (1), M may be one or more kinds of elements selected from the group consisting of Sm, Eu, Tb, and Dy.

According to the above configuration, a solid electrolyte material having a low melting point can be realized.

In addition, in the composition formula (1), M may include Sm.

According to the above configuration, a solid electrolyte material having a low melting point can be realized.

In addition, in the composition formula (1), $0 < x \leq 0.5$ may be satisfied. In addition, further, the value of x may satisfy $0.05 \leq x \leq 0.5$.

According to the above configuration, a solid electrolyte material having both a low melting point and high ionic conductivity can be realized.

In addition, in the composition formula (1), $-0.05 \leq d \leq 0.15$ may be satisfied. The value of d may satisfy $-0.05 \leq d \leq 0.11$. In addition, $0 \leq d \leq 0.11$ may be satisfied.

According to the above configuration, a solid electrolyte material having both a low melting point and high ionic conductivity can be realized.

In addition, in the composition formula (1), X may include one or more kinds of elements selected from the group consisting of Cl and Br.

According to the above configuration, a solid electrolyte material having both a low melting point and high ionic conductivity can be realized.

In addition, in the composition formula (1), X may include Br and Cl.

According to the above configuration, a solid electrolyte material having both a low melting point and high ionic conductivity can be realized.

Note that the solid electrolyte material in the first embodiment may be crystalline or amorphous.

In addition, a shape of the solid electrolyte material in the first embodiment is not particularly limited, and may be, for example, an acicular shape, a spherical shape, an elliptical spherical shape, or a fibrous shape. For example, the solid electrolyte material in the first embodiment may be particles. In addition, the solid electrolyte material in the first embodiment may be formed into a pellet shape or a plate shape by pressurization after a plurality of particles are stacked.

For example, if the shape of the solid electrolyte material in the first embodiment is particulate (for example, spherical), the median diameter thereof may be not less than 0.1 μm and not more than 100 μm.

In addition, in the first embodiment, the median diameter may be not less than 0.5 μm and not more than 10 μm.

According to the above configuration, ionic conductivity can be further improved. In addition, a better dispersion state of the solid electrolyte material in the first embodiment and an active material can be formed.

In addition, in the first embodiment, the solid electrolyte material may be smaller than the median diameter of the active material.

According to the above configuration, a better dispersion state of the solid electrolyte material in the first embodiment and the active material can be formed.

<Manufacturing Method of Solid Electrolyte Material>

The solid electrolyte material in the first embodiment may be manufactured by the following method, for example.

Binary halide raw material powders are prepared so as to have a blending ratio of a target composition. For example, if $Li_3Y_{0.9}Sm_{0.1}Br_3Cl_3$ is produced, LiBr, $YCl_3$ and $SmCl_3$ are prepared in a molar ratio of approximately 3.0:0.9:0.1. In consideration of the change in composition during a synthesis process, the blending ratio may be adjusted in advance so as to cancel the change. The above-mentioned "d" and "x" can be adjusted by adjusting the raw materials, the blending ratio and, the synthesis process.

The raw material is not limited to the above. For example, a combination of LiCl and $YBr_3$ or a composite anion compound such as $LiBr_{0.5}Cl_{0.5}$ may be used as the raw material. In addition, as a raw material, a mixture of an oxygen-including substance such as an oxide, hydroxide, sulfate, or nitrate and a halide such as ammonium halide may be used.

The raw material powders are mixed well using a mortar with a pestle. Alternatively, the raw material powders are mixed well using a ball mill or a mixer. Thereafter, the mixture is sintered in a vacuum or in an inert atmosphere. It is desirable that the mixture is sintered, for example, for 1 hour or longer within a range of not less than 100 degrees Celsius and not more than 650 degrees Celsius.

In this way, the solid electrolyte material including the composition as described above is provided.

Second Embodiment

Hereinafter, the second embodiment will be described. The description which has been set forth in the above-described first embodiment is omitted appropriately.

The battery in the second embodiment is configured using the solid electrolyte material described in the first embodiment.

The battery in the second embodiment comprises a positive electrode, a negative electrode, and an electrolyte layer.

The electrolyte layer is a layer provided between the positive electrode and the negative electrode.

At least one of the positive electrode, the electrolyte layer, and the negative electrode includes the solid electrolyte material in the first embodiment.

According to the above configuration, the charge/discharge characteristic of the battery can be improved.

A solid electrolyte material having a low melting point is softer than a solid electrolyte material having a higher melting point. As a result, adhesiveness of the interface between the active material and the solid electrolyte material can be satisfactorily formed during pressure molding. As a result, the charge/discharge characteristic of a battery can be improved. In addition, even if the active material and the solid electrolyte material are integrated by sintering, it is possible to realize formation of a favorable interface and suppression of a side reaction.

The solid electrolyte material in the first embodiment may be included in a plurality of particles, and the plurality of the particles may be included in the positive electrode layer, the electrolyte layer, or the negative electrode layer. The solid electrolyte material included in the plurality of the particles may be only one kind or a plurality of kinds. In addition, the components of the solid electrolyte material may be the same in all of the plurality of the particles. Alternatively, at least one of the plurality of the particles may have a solid electrolyte material component different from those of other particles. In addition, the at least one of the plurality of the particles may include a plurality of regions having different compositions from each other. For example, a solid battery may be configured by using only $Li_3Y_{1-x}M_xX_6$ as a solid electrolyte material. Alternatively, a solid battery described in the first embodiment may be configured by mixing $Li_3Y_{1-x}M-X_6$ particles together with $Li_3YX_5$ particles.

According to the above configuration, a favorable interface between the solid electrolytes can be formed. A favorable interface between the solid electrolyte and the active material can be formed.

A specific example of the battery in the second embodiment will be described below.

FIG. 1 is a cross-sectional view showing a schematic configuration of a battery 1000 in the second embodiment.

The battery 1000 in the second embodiment comprises a positive electrode 201, a negative electrode 203, and an electrolyte layer 202.

The positive electrode 201 includes positive electrode active material particles 204 and solid electrolyte particles 100.

The electrolyte layer 202 is disposed between the positive electrode 201 and the negative electrode 203.

The electrolyte layer 202 includes an electrolyte material (for example, a solid electrolyte material).

The negative electrode 203 includes negative electrode active material particles 205 and the solid electrolyte particles 100.

The solid electrolyte particles 100 are particles each consisting of the solid electrolyte material in the first embodiment or particles each including the solid electrolyte material in the first embodiment as a main component.

The positive electrode 201 includes a material having a characteristic of storing and releasing metal ions (for example, lithium ions). The positive electrode 201 includes, for example, a positive electrode active material (for example, the positive electrode active material particles 204).

As the positive electrode active material, for example, a lithium-containing transition metal oxide (e.g., Li(NiCoAl)$O_2$, or $LiCoO_2$), a transition metal fluoride, a polyanion material, a fluorinated polyanion material, a transition metal sulfide, a transition metal oxyfluoride, a transition metal oxysulfide, and a transition metal oxynitride can be used.

The median diameter of each of the positive electrode active material particles 204 may be not less than 0.1 µm and not more than 100 µm. If the median diameter of each of the positive electrode active material particles 204 is not less than 0.1 µm, the positive electrode active material particles 204 and the halide solid electrolyte material can form a good dispersion state in the positive electrode. As a result, the charge/discharge characteristic of the battery is improved. In addition, if the median diameter of each of the positive electrode active material particles 204 is not more than 100 µm, lithium diffusion in the positive electrode active material particles 204 is accelerated. As a result, the battery can operate at a high output.

The median diameter of each of the positive electrode active material particles 204 may be larger than the median diameter of the halide solid electrolyte material. In this case, the favorable dispersion state of the positive electrode active material particle 204 and the halide solid electrolyte material can be formed.

With regard to a volume ratio "v:100-v" between the positive electrode active material particles 204 and the halide solid electrolyte material included in the positive electrode 201, 30≤v≤95 may be satisfied. In a case of 30≤v, a sufficient battery energy density can be secured. In addition, if v≤95, an operation at a high output can be realized.

The thickness of the positive electrode 201 may be 10 to 500 µm. If the thickness of the positive electrode is 10 µm or more, a sufficient battery energy density can be ensured. In addition, if the thickness of the positive electrode is 500 µm or less, an operation at a high output can be realized.

The electrolyte layer 202 is a layer including an electrolyte material. The electrolyte material is, for example, a solid electrolyte material. In other words, the electrolyte layer 202 may be a solid electrolyte layer.

The solid electrolyte layer may contain the solid electrolyte material in the first embodiment as a main component. In other words, the solid electrolyte layer may include the solid electrolyte material in the above-described first embodiment, for example, at 50% or more (namely, 50% by weight or more) of a weight ratio electrolyte with respect to the entire solid electrolyte layer.

According to the above configuration, a solid electrolyte material having a low melting point can be realized.

In addition, the solid electrolyte layer may include the solid electrolyte material in the above-described first embodiment, for example, at 70% or more (namely, 70% by weight or more) of the weight ratio electrolyte with respect to the entire solid electrolyte layer.

According to the above configuration, a solid electrolyte material having a low melting point can be realized.

In addition, the solid electrolyte layer includes the solid electrolyte material in the above-described first embodiment as a main component, and further includes inevitable impurities, starting materials and auxiliary substances used when the solid electrolyte material is synthesized, or decomposition products.

In addition, the solid electrolyte layer may include the solid electrolyte material in the first embodiment, for example, at 100% (namely, 100% by weight) by weight with respect to the entire solid electrolyte layer, excluding impurities mixed inevitably.

According to the above configuration, a solid electrolyte material having a low melting point can be realized.

As described above, the solid electrolyte layer may be composed only of the solid electrolyte material in the first embodiment.

Alternatively, the solid electrolyte layer may be composed only of a solid electrolyte material different from the solid electrolyte material in the first embodiment. As the solid electrolyte material different from the solid electrolyte material in the first embodiment, for example, $Li_2MgX_4$, $Li_2FeX_4$, $Li(Al, Ga, In)X_4$, $Li_3(Al, Ga, In)X_6$, or LiI may be used. Here, X includes at least one selected from the group consisting of Cl, Br, and The solid electrolyte layer may include simultaneously the solid electrolyte material in the first embodiment and the solid electrolyte material different from the solid electrolyte material in the first embodiment. At this time, both may be dispersed uniformly. Alternatively, the layer formed of the solid electrolyte material in the first embodiment and the layer formed of the solid electrolyte material different from the solid electrolyte material in the first embodiment are sequentially arranged in the stacking direction of the battery.

The thickness of the solid electrolyte layer may be not less than 1 µm and not more than 100 µm. If the thickness of the solid electrolyte layer is not less than 1 µm, the positive electrode 201 and the negative electrode 203 are easily separated. In addition, if the thickness of the solid electrolyte layer is not more than 100 µm, an operation at a high output can be realized.

The negative electrode 203 includes a material having a characteristic of storing and releasing metal ions (for example, lithium ions). The negative electrode 203 includes, for example, a negative electrode active material (for example, negative electrode active material particles 205).

As the negative electrode active material, a metal material, a carbon material, an oxide, a nitride, a tin compound, or a silicon compound can be used. The metal material may be a single metal. Alternatively, the metal material may be an alloy. Examples of the metal material include lithium metal and lithium alloy. Examples of the carbon material include natural graphite, coke, graphitized carbon, carbon fiber, spherical carbon, artificial graphite, and amorphous carbon. From the viewpoint of capacity density, silicon (Si), tin (Sn), a silicon compound, or a tin compound can be used. If a negative electrode active material having a low average reaction voltage is used, the effect of suppressing electrolysis by the solid electrolyte material in the first embodiment is better exhibited.

The median diameter of each of the negative electrode active material particles 205 may be not less than 0.1 µm and not more than 100 µm. If the median diameter of each of the negative electrode active material particles 205 is not less than 0.1 µm, the negative electrode active material particles 205 and the solid electrolyte particles 100 can form a good dispersion state in the negative electrode. As a result, the charge/discharge characteristic of the battery is improved. In addition, if the median diameter of each of the negative electrode active material particles 205 is not more than 100 µm, the lithium diffusion in the negative electrode active material particles 205 is accelerated. For this reason, the battery can operate at a high output.

The median diameter of each of the negative electrode active material particles 205 may be larger than the median diameter of the solid electrolyte particles 100. As a result, the favorable dispersion state of the negative electrode active material particle 205 and the halide solid electrolyte material can be formed.

With regard to the volume ratio "v:100-v" of the negative electrode active material particles 205 and the solid electrolyte particles 100 included in the negative electrode 203, 30 ≤v≤95 may be satisfied. In a case of 30≤v, a sufficient battery energy density can be secured. In addition, if v≤95, an operation at a high output can be realized.

The thickness of the negative electrode 203 may be not less than 10 µm and not more than 500 µm. If the thickness of the negative electrode is not less than 10 µm, the sufficient battery energy density can be secured. In addition, if the thickness of the positive electrode is not more than 500 µm, an operation at a high output can be realized.

At least one of the positive electrode 201, the electrolyte layer 202, and the negative electrode 203 may include a sulfide solid electrolyte or an oxide solid electrolyte for the purpose of improving ionic conductivity, chemical stability, and electrochemical stability. As the sulfide solid electrolyte, $Li_2S$—$P_2S_5$, $Li_2S$—$SiS_2$, $Li_2S$—$B_2S_3$, $Li_2S$—$GeS_2$, or $Li_{3.25}Ge_{0.75}P_{0.25}S_4$, $Li_{10}GeP_2S_{12}$ can be used. As the oxide solid electrolyte, a NASICON solid electrolyte typified by $LiTi_2(PO_4)_3$ and its element substitution, a $(LaLi)TiO_3$ perovskite solid electrolyte, a LIS ICON solid electrolyte typified by $Li_{14}ZnGe_4O_{16}$, $Li_4SiO_4$, or $LiGeO_4$ and its element substitution, a garnet solid electrolyte typified by $Li_7La_3Zr_2O_{12}$ and its element substitution, $Li_3N$ and its H substitution, or $Li_3PO_4$ and its N substitution can be used.

At least one of the positive electrode 201, the electrolyte layer 202, and the negative electrode 203 may include an organic polymer solid electrolyte for the purpose of increasing ionic conductivity. As the organic polymer solid electrolyte, for example, a compound of a polymer compound and a lithium salt can be used. The polymer compound may have an ethylene oxide structure. Since the polymer compound has the ethylene oxide structure, a large amount of lithium salt can be included, and the ionic conductivity can be further increased. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these may be used alone. Alternatively, a mixture of two or more lithium salts selected from these may be used as the lithium salt.

At least one of the positive electrode 201, the electrolyte layer 202, and the negative electrode 203 may include a non-aqueous electrolyte solution, a gel electrolyte, and an ionic liquid for the purpose of facilitating exchange of lithium ions and improving the output characteristic of the battery.

The non-aqueous electrolyte solution includes a non-aqueous solvent and a lithium salt dissolved in the non-aqueous solvent. As the non-aqueous solvent, a cyclic carbonate solvent, a chain carbonate solvent, a cyclic ether solvent, a chain ether solvent, a cyclic ester solvent, a chain ester solvent, or a fluorine solvent can be used. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. As the non-aqueous solvent, one non-aqueous solvent selected from these can be used alone. Alternatively, a combination of two or more non-aqueous solvents selected from these can be used as the non-aqueous solvent. The non-aqueous electrolyte solution may contain at least one fluorine solvent selected from the group consisting of fluoroethylene carbonate, methyl fluoropropionate, fluorobenzene, fluoroethyl methyl carbonate, and fluorodimethylene carbonate. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these may be used alone. Alternatively, a mixture of two or more lithium salts selected from these may be used as the lithium salt. The concentration of the lithium salt is, for example, in the range of 0.5 to 2 mol/liter.

As the gel electrolyte, a polymer material including a non-aqueous electrolyte solution can be used. As the polymer material, polyethylene oxide, polyacrylonitrile, polyvinylidene fluoride, polymethyl methacrylate, or a polymer having an ethylene oxide bond may be used.

The cation which forms the ionic liquid is an aliphatic chain quaternary salt such as tetraalkylammonium or tetraalkylphosphonium, an aliphatic cyclic ammonium such as pyrrolidinium, morpholinium, imidazolinium, tetrahydropyrimidinium, piperazinium or piperidinium, a nitrogen-including heterocyclic aromatic cation such as pyridinium or imidazolium. The anion which forms the ionic liquid is $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may contain a lithium salt.

At least one of the positive electrode 201, the electrolyte layer 202, and the negative electrode 203 may include a binder for the purpose of improving adhesion between the particles. The binder is used to improve the binding property of the material which forms the electrode. The binders include polyvinylidene fluoride, polytetrafluoroethylene, polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyethersulfone, hexafluoropolypropylene, styrene butadiene rubber, or carboxymethylcellulose. The binder includes a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. In addition, two or more kinds selected from these may be mixed and used as a binder.

In addition, at least one of the positive electrode 201 and the negative electrode 203 may include a conductive agent as necessary.

The conductive agent is used to lower electrode resistance. Examples of the conductive agent include graphite such as natural graphite or artificial graphite, carbon black such as acetylene black or ketjen black, a conductive fiber such as a carbon fiber or a metal fiber, a metal powder such as carbon fluoride or aluminum, a conductive whisker such as zinc oxide or potassium titanate, a conductive metal oxide such as titanium oxide, or a conductive polymer compound such as polyaniline, polypyrrole, or polythiophene. In addition, cost reduction can be achieved by using carbon conductive agent as the conductive agent.

Note that the battery in the second embodiment can be configured as a battery having various shapes such as a coin shape, a cylindrical shape, a prism shape, a sheet shape, a button shape, a flat shape, or a laminated shape.

EXAMPLES

Hereinafter, details of the present disclosure will be described with reference to inventive examples and comparative examples.

Inventive Example A1

[Production of Solid Electrolyte Material]

In an argon atmosphere with a dew point of not more than −60° C., LiBr, $YCl_3$, and $SmCl_3$ were prepared as raw powders at a molar ratio $LiBr:YCl_3:SmCl_3=3:0.95:0.05$. These were ground and mixed in a mortar, and then, sintered at 500° C. for 3 hours in an electric furnace. Subsequently, the coarse particles were ground using a pestle and a mortar.

Thus, a solid electrolyte material powder represented by the composition formula of $Li_3Y_{0.95}Sm_{0.05}Br_3Cl_3$ (hereinafter, referred to as powder A1) was provided.

[Measurement of Melting Point]

Figure 2:
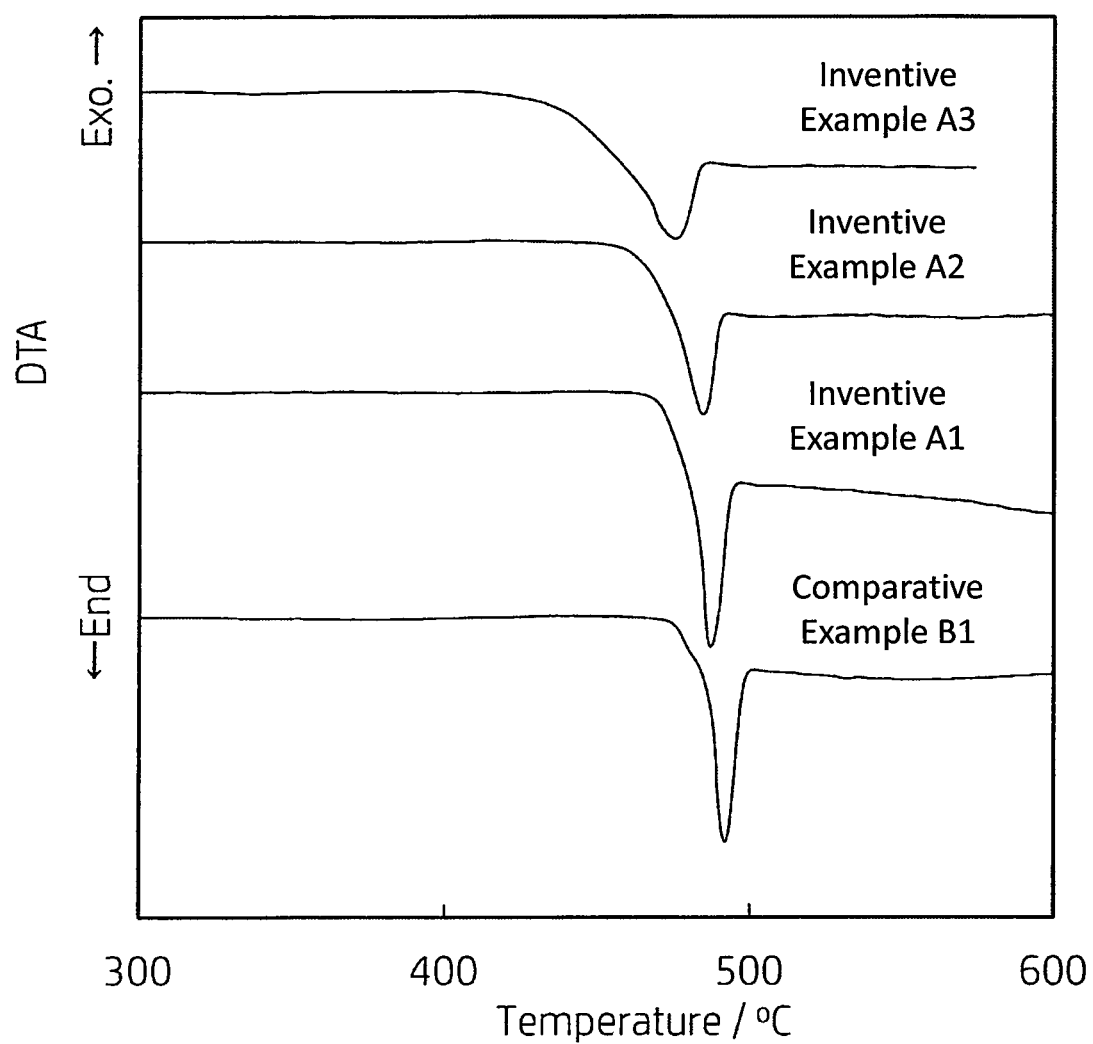
FIG. 2 is a graph showing DTA measurement results.

The melting point of the powder A1 was measured using TG-DTA manufactured by RIGAKU Corporation in an argon atmosphere with a dew point of not more than −30° C. More specifically, the melting point of the powder A1 was measured as follows. In other words, in a dry room having a dew point of not more than −30° C., approximately 10 mg of the powder A1 was put into a platinum container and heated to 600° C. at a heating rate of 10 K/min under an argon flow. The endothermic start point of the endothermic peak observed at that time was taken as the melting point. If a plurality of endothermic peaks appeared, the one observed on the lower temperature side was regarded as the melting point. FIG. 2 shows DTA patterns of the inventive examples A1 to A3 and the comparative example B1. The inventive examples A2 and A3 and the comparative example B1 will be described later.

[Production of Secondary Battery]

In an argon glove box, the powder A1 and Li(Ni, Co, Mn)$O_2$, which is an active material, were prepared at a volume ratio of 50:50. These were mixed in an agate mortar to prepare a mixture.

In an insulating outer cylinder, 60 mg of a sulfide solid electrolyte $Li_6PS_5Cl$, the powder A1 the amount of which corresponded to a thickness of 700 μm after pressure molding, and 9.6 mg of the above-mentioned mixture were stacked in this order. These were pressure-molded at a pressure of 720 MPa to provide a first electrode and a solid electrolyte layer.

Next, metal In foil and Li foil were stacked on the opposite side to the side which was in contact with the first electrode of the solid electrolyte layer. These were pressure-molded at a pressure of 80 MPa to produce a stacking structure of the first electrode, the solid electrolyte layer, and a second electrode.

Next, stainless-steel current collectors were disposed on the upper and lower parts of the stacking structure, and current collector leads were attached to the current collectors. Finally, an insulating ferrule was used to block and seal the inside of the insulating outer cylinder from the outside atmosphere. In this way, a battery A1 of the inventive example 1 was produced.

[Charge/Discharge Test]

Figure 3:
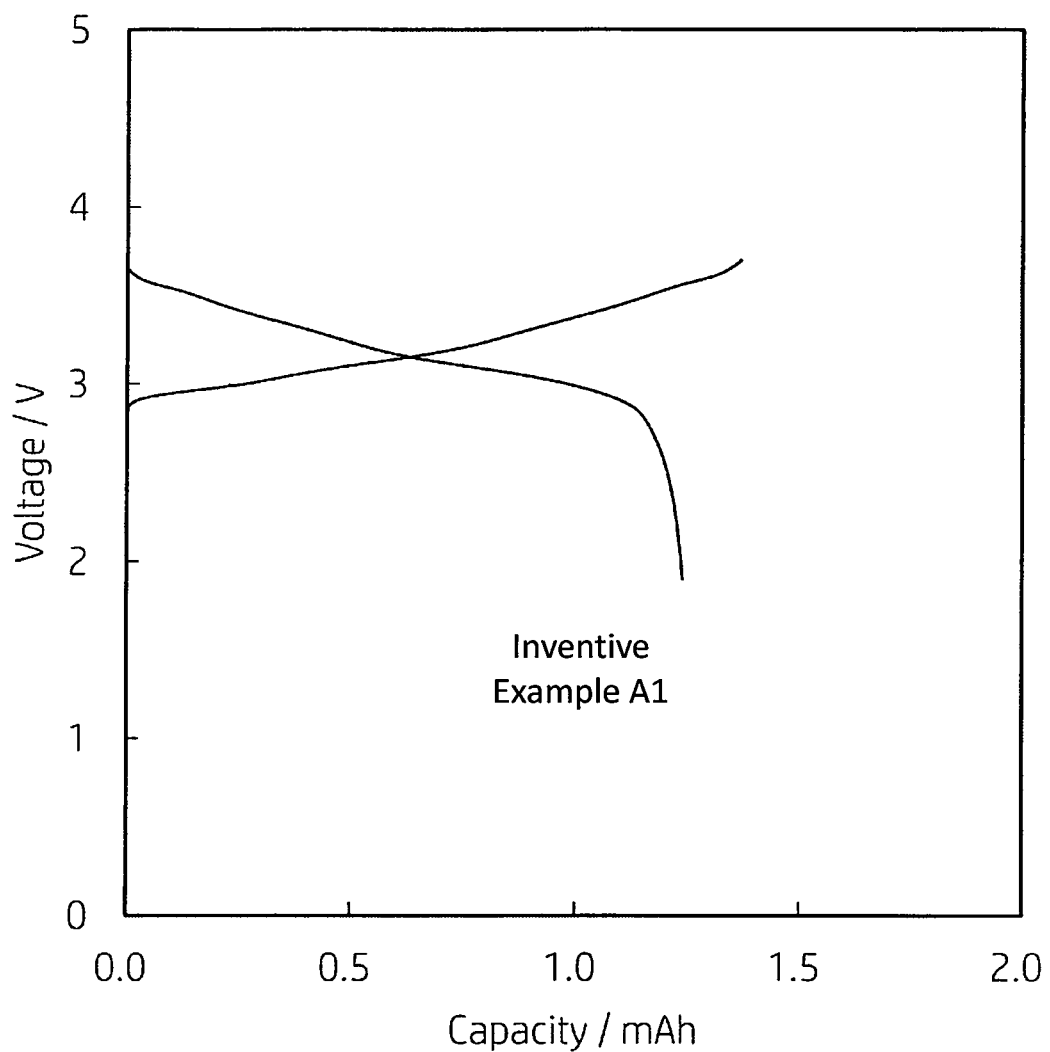
FIG. 3 is a graph showing an initial charge/discharge characteristic.

FIG. 3 is a graph showing an initial charge/discharge characteristic of the battery A1. The result of FIG. 3 was measured by the following method. In other words, first, the battery A1 was placed in a thermostatic chamber at 25° C. Next, constant current charging was performed at a current value of 0.05 C rate (20 hour rate) with respect to a theoretical capacity of the battery, and the charging was terminated at a voltage of 3.7 V. Next, the battery was discharged at a current value of 0.05 C rate, and the discharge was terminated at a voltage of 1.9V. As a result of the measurement, the initial discharge capacity of the secondary battery of the inventive example A1 was 1.2 mAh.

Inventive Examples A2 to A6

In an argon atmosphere with a dew point of not more than −60° C., LiBr, $YCl_3$, and $MCl_3$ were prepared at a molar ratio of $LiBr:YCl_3:MCl_3=3:1-x:x$. Here, M is Sm, Eu, Tb, or Dy. Except for the above, solid electrolyte material powders A2 to A6 were prepared in the same manner as in the inventive example 1. The value of x and the element M are shown in Table 1.

[Measurement of Melting Point]

Melting points were measured using the powders A2 to A6 in the same manner as in the inventive example A1.

[Production of Secondary Battery]

In the same manner as in the inventive example A1 batteries A2 to A6 were produced using the powders A2 to A6, and the charge/discharge test was performed. The initial charge/discharge characteristics of the batteries A2 to A6 were as good as the battery A1.

Comparative Examples B1 to B3

In an argon atmosphere with a dew point of not more than −60° C., LiBr, $YCl_3$, and $MCl_3$ were prepared at a molar ratio of $LiBr:YCl_3:MCl_3=3:1-x:x$. Here, M is Er or Lu. Except for the above, solid electrolyte material powders B1 to B3 were provided in the same manner as in the inventive example 1. Using the powders B1 to B3, the melting points were measured in the same manner as in the inventive example A1.

Table 1 shows the compositions and melting points in the inventive examples A1 to A6 and the comparative examples B1 to B3.

TABLE 1

| | Composition | M | x | Melting Point/° C. |
|---|---|---|---|---|
| Inventive example A1 | $Li_3Y_{0.95}Sm_{0.05}Br_3Cl_3$ | Sm | 0.05 | 468 |
| Inventive example A2 | $Li_3Y_{0.9}Sm_{0.1}Br_3Cl_3$ | Sm | 0.1 | 466 |
| Inventive example A3 | $Li_3Y_{0.8}Sm_{0.2}Br_3Cl_3$ | Sm | 0.2 | 432 |
| Inventive example A4 | $Li_3Y_{0.9}Eu_{0.1}Br_3Cl_3$ | Eu | 0.1 | 469 |
| Inventive example A5 | $Li_3Y_{0.9}Tb_{0.1}Br_3Cl_3$ | Tb | 0.1 | 471 |
| Inventive example A6 | $Li_3Y_{0.9}Dy_{0.1}Br_3Cl_3$ | Dy | 0.1 | 470 |
| Comparative Example B1 | $Li_3YBr_3Cl_3$ | — | 0 | 475 |
| Comparative Example B2 | $Li_3Y_{0.9}Er_{0.1}Br_3Cl_3$ | Er | 0.1 | 476 |
| Comparative Example B3 | $Li_3Y_{0.9}Lu_{0.1}Br_3Cl_3$ | Lu | 0.1 | 477 |

<<Discussion 1>>

It can be seen that each of the powders A1 to A6 of the inventive examples A1 to A6 has a lower melting point than the powders B1 to B3 of the comparative examples B1 to B3. In other words, it can be seen that the melting point of the solid electrolyte material is lowered, if an element having an ionic radius larger than that of Y, such as Sm, Eu, Tb, and Dy, is substituted for Y of $Li_3YBr_3Cl_3$. This would be because, for example, if an element having an ionic radius larger than that of Y is substituted for Y in $Li_3YX_6$, the bond distance between the halide ion and the metal ion both of which form the crystal is increased, and the bonding force is weakened.

On the other hand, as shown in the powders B2 and B3 of the comparative examples B2 and B3, if an element having an ionic radius smaller than that of Y, such as Er and Lu, is substituted, no lowering in the melting point of the solid electrolyte material is observed. This would be because, for example, if an element having an ionic radius smaller than that of Y is substituted for Y of $Li_3YX_6$, the bond distance between the halide ion and the metal ion both of which form the crystal is shortened.

In addition, as shown in the powders A1 to A3 of the inventive examples A1 to A3, it can be seen that the melting point of the solid electrolyte material is further lowered with an increase in the amount of the element having an ionic radius larger than that of Y to be substituted is increased. Therefore, if it is desired to further lower the melting point of the solid electrolyte material, the substitution amount of the element having an ionic radius larger than that of Y is increased.

In addition, a solid battery using the solid electrolyte material of the present disclosure can form a good solid electrolyte material/active material interface operable as a battery, even if the solid battery is molded by pressure molding at room temperature. As a result, the resistance of the battery can be lowered, and the charge/discharge capacity of the battery is improved. This is because a solid electrolyte material having a low melting point is softer than a material having a high melting point. Furthermore, since the solid electrolyte material of the present disclosure does not contain sulfur as a constituent element, hydrogen sulfide, which is harmful, is not generated.

Table 2 shows atomic numbers, element names, and ionic radii according to Shannon's definition.

TABLE 2

| Atomic number | Element | ionic radius/Å |
|---|---|---|
| 39 | Y | 0.900 |
| 57 | La | 1.032 |
| 58 | Ce | 1.010 |
| 59 | Pr | 0.990 |
| 60 | Nd | 0.983 |
| 61 | Pm | 0.970 |
| 62 | Sm | 0.958 |
| 63 | Eu | 0.947 |
| 64 | Gd | 0.938 |
| 65 | Tb | 0.923 |
| 66 | Dy | 0.912 |
| 67 | Ho | 0.901 |
| 68 | Er | 0.890 |
| 69 | Tm | 0.880 |
| 70 | Yb | 0.868 |
| 71 | Lu | 0.861 |

Inventive Example A7

In an argon atmosphere with a dew point of not more than −60° C., LiBr, $YCl_3$, $YBr_3$, and $SmCl_3$ were prepared as raw powders at a molar ratio $LiBr:YCl_3:YBr_3:SmCl_3$=3.000: 0.567:0.333:0.100. Except for the above, a solid electrolyte material powder A7 was provided in the same manner as in the inventive example A1. Using the powder A7, the melting point was measured in the same manner as in the inventive example A1.

Inventive Example A8

In an argon atmosphere with a dew point of not more than −60° C., LiBr, $YCl_3$, $YBr_3$, and $SmCl_3$ were prepared as raw powders at a molar ratio $LiBr:YCl_3:YBr_3:SmCl_3$=3,000: 0167:0.333:0.500. Except for the above, a solid electrolyte material powder A8 was provided in the same manner as in the inventive example A1. Using the powder A8, the melting point was measured in the same manner as in the inventive example A1.

Comparative Example B4

In an argon atmosphere with a dew point of not more than −60° C., LiBr, $YCl_3$, and $YBr_3$ were prepared as raw powders at a molar ratio $LiBr:YCl_3:YBr_3$=3.000:0.667: 0.333. Except for the above, a solid electrolyte material powder B4 was provided in the same manner as in the inventive example A1. Using powder B4, the melting point was measured in the same manner as in the inventive example A1.

Table 3 shows the compositions and the melting points in the inventive examples A7 and A8 and the comparative example B4.

TABLE 3

| | Composition | M | X | Melting point/° C. |
|---|---|---|---|---|
| Inventive example A7 | $Li_3Y_{0.9}Sm_{0.1}Br_4Cl_2$ | Sm | 0.1 | 469 |
| Inventive example A8 | $Li_3Y_{0.5}Sm_{0.5}Br_4Cl_2$ | Sm | 0.5 | 405 |
| Comparative example B4 | $Li_3YBr_4Cl_2$ | — | 0 | 485 |

<<Discussion 2>>

It can be seen that each of the powders A7 and A8 of the inventive examples A7 and A8 has a lower melting point than the powder B4 of the comparative example B4. In other words, it can be seen that the melting point of the solid electrolyte material is lowered, if an element having an ionic radius larger than that of Y such as Sm is substituted for Y of $Li_3YBr_4Cl_2$, The mechanism by which the melting point is lowered would be the same as that in Discussion 1.

From these results, it has been clear that the melting point of the solid electrolyte material is lowered by substituting an element having an ionic radius larger than that of Y regardless of the ratio of X (=halogen element). In addition, the effect of lowering the melting point would be observed, even if F or I, which has chemical properties close to those of Br or Cl, is used as the halogen element. Note that the melting point of the solid electrolyte material is varied, depending on the bond distance between the metal ion and the halide ion. As a result, the change in the ratio between Li and the metal element would hardly affect the effect of lowering the melting point. In other words, even if d in the composition formula (1) changes from 0, the same effect as in the case of d=0 would be provided. From the viewpoint of electrical conductivity, it is desirable that −0.15≤d≤0.15 is satisfied in the composition formula (1).

INDUSTRIAL APPLICABILITY

The battery of the present disclosure can be used as, for example, an all-solid lithium secondary battery.

REFERENTIAL SIGNS LIST

100 Solid electrolyte particles
201 Positive electrode
202 Electrolyte layer
203 Negative electrode
204 Positive electrode active material particle
205 Negative electrode active material particle
1000 Battery

The invention claimed is:

1. A solid electrolyte material represented by the following composition formula (1):

$$Li_{3-3d}(Y_{1-x}M_x)_{1+d}X_6 \quad \text{Formula (1)}$$

where
M is an element having an ionic radius larger than that of Y;
X is at least one kind of element selected from the group consisting of F, Cl, Br and I;
$0<x<1$; and
$-0.15 \leq d \leq 0.15$.

2. The solid electrolyte material according to claim 1, wherein
M is one or more kinds of trivalent elements.

3. The solid electrolyte material according to claim 1, wherein
M is one or more kinds of rare earth elements.

4. The solid electrolyte material according to claim 1, wherein
M is one or more kinds of elements selected from the group consisting of La, Ce, Pr, Nd, Pm, Sm, Eu, Gd, Tb, Dy, and Ho.

5. The solid electrolyte material according to claim 4, wherein
M is one or more kinds of elements selected from the group consisting of Sm, Eu, Tb, and Dy.

6. The solid electrolyte material according to claim 1, wherein
M includes Sm.

7. The solid electrolyte material according to claim 1, wherein
the formula (1) satisfies $0<x\leq0.5$.

8. The solid electrolyte material according to claim 7, wherein
the formula (1) satisfies $0.05\leq x\leq0.5$.

9. The solid electrolyte material according to claim 1, wherein
the formula (1) satisfies $-0.05\leq d\leq0.15$.

10. The solid electrolyte material according to claim 9, wherein
the formula (1) satisfies $-0.05\leq d\leq0.11$.

11. The solid electrolyte material according to claim 10, wherein
the formula (1) satisfies $0\leq d\leq0.11$.

12. The solid electrolyte material according to claim 1, wherein
X includes one or more kinds of elements selected from the group consisting of Br and Cl.

13. The solid electrolyte material according to claim 12, wherein
X includes Br and Cl.

14. A battery, comprising:
a positive electrode;
a negative electrode; and
an electrolyte layer provided between the positive electrode and the negative electrode,
wherein
at least one selected from the group consisting of the positive electrode, the negative electrode, and the electrolyte layer includes a solid electrolyte material according to claim 1.

* * * * *